(12) United States Patent
Hung

(10) Patent No.: US 8,359,078 B2
(45) Date of Patent: Jan. 22, 2013

(54) MOBILE MEDIA DEVICE ENCLOSURE, METHOD OF USE OF MOBILE MEDIA DEVICE ENCLOSURE, AND METHOD OF PROVIDING MOBILE MEDIA DEVICE ENCLOSURE

(75) Inventor: Juliana S. Hung, Arcadia, CA (US)

(73) Assignee: Belkin International, Inc., Playa Vista, CA (US)

( * ) Notice: Subject to any disclaimer, the term of this patent is extended or adjusted under 35 U.S.C. 154(b) by 413 days.

(21) Appl. No.: 12/791,860

(22) Filed: Jun. 1, 2010

(65) Prior Publication Data

US 2010/0300909 A1    Dec. 2, 2010

Related U.S. Application Data

(60) Provisional application No. 61/182,289, filed on May 29, 2009.

(51) Int. Cl.
*H04M 1/00*      (2006.01)
(52) U.S. Cl. .................. 455/575.8; 379/437; 379/440
(58) Field of Classification Search ............... 455/575.8, 455/575.1; 379/433.11–433.13, 437–440; D14/138 R–138 G, 137
See application file for complete search history.

(56) References Cited

U.S. PATENT DOCUMENTS

| | | | |
|---|---|---|---|
| 982,292 A | 1/1911 | Naramore |
| 1,613,536 A | 1/1927 | Rose |
| 1,659,395 A | 2/1928 | Douglas |
| 1,863,047 A | 6/1932 | Grimsley |
| 3,741,376 A | 6/1973 | Brown et al. |
| 3,769,741 A | 11/1973 | Hessler et al. |
| 4,213,520 A | 7/1980 | Sarna et al. |
| 4,259,568 A | 3/1981 | Dynesen |
| 4,400,161 A | 8/1983 | Gerlt |
| 4,467,551 A | 8/1984 | Pulver |
| 4,544,123 A | 10/1985 | Peacock |
| 4,663,880 A | 5/1987 | Grobl |
| 4,703,161 A | 10/1987 | McLean |
| 4,896,805 A | 1/1990 | Klaczak et al. |
| 5,295,089 A | 3/1994 | Ambasz |
| 5,423,363 A | 6/1995 | Matzdorff et al. |
| 5,607,054 A | 3/1997 | Hollingsworth |
| 5,706,992 A | 1/1998 | Moor |
| 5,724,225 A | 3/1998 | Hrusoff et al. |
| 5,887,723 A | 3/1999 | Myles et al. |
| 5,887,777 A | 3/1999 | Myles et al. |
| 5,913,683 A | 6/1999 | Rahmoune et al. |

(Continued)

OTHER PUBLICATIONS

U.S. Appl. No. 12/782,592, filed May 18, 2010, Saharut Sirichai, for "Case for Electrical Device and Method of Using Same".

(Continued)

*Primary Examiner* — Christian Hannon
(74) *Attorney, Agent, or Firm* — Bryan Cave LLP

(57) ABSTRACT

In some embodiments, a mobile media device enclosure can include: (a) an enclosure having an interior, an exterior, a top side, a bottom side, a right side, and a left side, the interior configured to form a cavity, the cavity is sized to retain a mobile media device therein; (b) a vertical boundary, the vertical boundary having a substantially vertical orientation and configured to substantially bisect the mobile media device enclosure from the top side to the bottom side; and (c) a horizontal boundary, the horizontal boundary having a substantially horizontal orientation and configured to substantially bisect the mobile media device enclosure from the left side to the right side. The vertical boundary and the horizontal boundary are further configured to substantially divide the mobile media device enclosure into four sections. Each of the four sections is elastically coupled to two other sections of the four sections. Other embodiments and related methods are also disclosed herein.

31 Claims, 12 Drawing Sheets

U.S. PATENT DOCUMENTS

| | | |
|---|---|---|
| 5,938,096 A | 8/1999 | Sauer et al. |
| 5,971,242 A | 10/1999 | Schuerman |
| 6,003,831 A | 12/1999 | Coleman |
| 6,145,661 A | 11/2000 | Jung |
| 6,354,477 B1 | 3/2002 | Trummer |
| 6,604,618 B1 | 8/2003 | Godshaw et al. |
| 6,697,045 B2 | 2/2004 | Min |
| 6,772,879 B1 | 8/2004 | Domotor |
| 7,104,516 B2 | 9/2006 | Uto et al. |
| 7,270,255 B2 | 9/2007 | Badillo et al. |
| 7,673,745 B2 | 3/2010 | Sirichai et al. |
| 7,735,644 B2 | 6/2010 | Sirichai et al. |
| 8,204,561 B2 * | 6/2012 | Mongan et al. ............ 455/575.8 |
| 2003/0219115 A1 | 11/2003 | Kohli et al. |
| 2003/0223184 A1 | 12/2003 | Nakamura |
| 2005/0098594 A1 | 5/2005 | Truong |
| 2005/0247584 A1 | 11/2005 | Lu |
| 2006/0243772 A1 | 11/2006 | Sirichai et al. |
| 2008/0194139 A1 | 8/2008 | Chan |
| 2010/0072334 A1 * | 3/2010 | Le Gette et al. ............ 248/176.3 |
| 2010/0240427 A1 * | 9/2010 | Lee ............................ 455/575.8 |
| 2011/0031287 A1 * | 2/2011 | Le Gette et al. ............... 224/101 |
| 2012/0199501 A1 * | 8/2012 | Le Gette et al. ............. 206/45.24 |

OTHER PUBLICATIONS

Internet website for kate spade broome street Leather Case for iPod, http://store.apple.com1-800-MY-APPLE/WebObjects/AppleStore.woa/7200407/wo/a57s1Lsyq6uK2dp6b..., Nov. 22, 2005.

* cited by examiner

MOBILE MEDIA DEVICE ENCLOSURE, METHOD OF USE OF MOBILE MEDIA DEVICE ENCLOSURE, AND METHOD OF PROVIDING MOBILE MEDIA DEVICE ENCLOSURE

CROSS REFERENCE TO RELATED APPLICATION

This application claims priority to U.S. Provisional Patent Application 61/182,289 filed on May 29, 2009. U.S. Provisional Patent Application 61/182,289 is incorporated herein by reference.

FIELD OF THE INVENTION

This invention relates generally to portable device enclosures, and relates, more particularly, to a case/enclosure for a portable digital media player including apparatuses and methods related thereto.

BACKGROUND

Advancing technology has made portable electrical devices (i.e., mobile media devices) increasingly popular and has given such electrical devices an ever-increasing array of capabilities. Some electrical devices, such as digital music and video players, cellular phones, personal digital assistants, handheld digital computers, and the like, include the capability to display images or videos. It is possible to view the images or videos while holding such video-capable devices in one's hand, but it would often be more convenient and more comfortable to set down such electrical devices and have them maintain a position in which the images and videos can be viewed easily. Examples of video-capable devices are the iPod® or iPhone® or iTouch® product by Apple Inc. of Cupertino, Calif. Another example of a video-capable device is the Blackberry® product by Research In Motion (RIM) of Waterloo, Ontario, Canada.

Furthermore, most portable electrical devices include display or touch screens and/or control mechanisms. It would be convenient for the user of such electrical devices if a protective case allowed easy viewing of the display screen from a distance and operation of the electrical device, without requiring the user to hold the electrical device or remove it from the case.

Accordingly, a need exists for a case for an electrical device that both protects the electrical device and allows it to maintain a hands-free operating and viewing position.

BRIEF DESCRIPTION OF THE DRAWINGS

The invention will be better understood from a reading of the following detailed description of examples of embodiments, taken in conjunction with the accompanying figures in the drawings in which.

Figure 1:
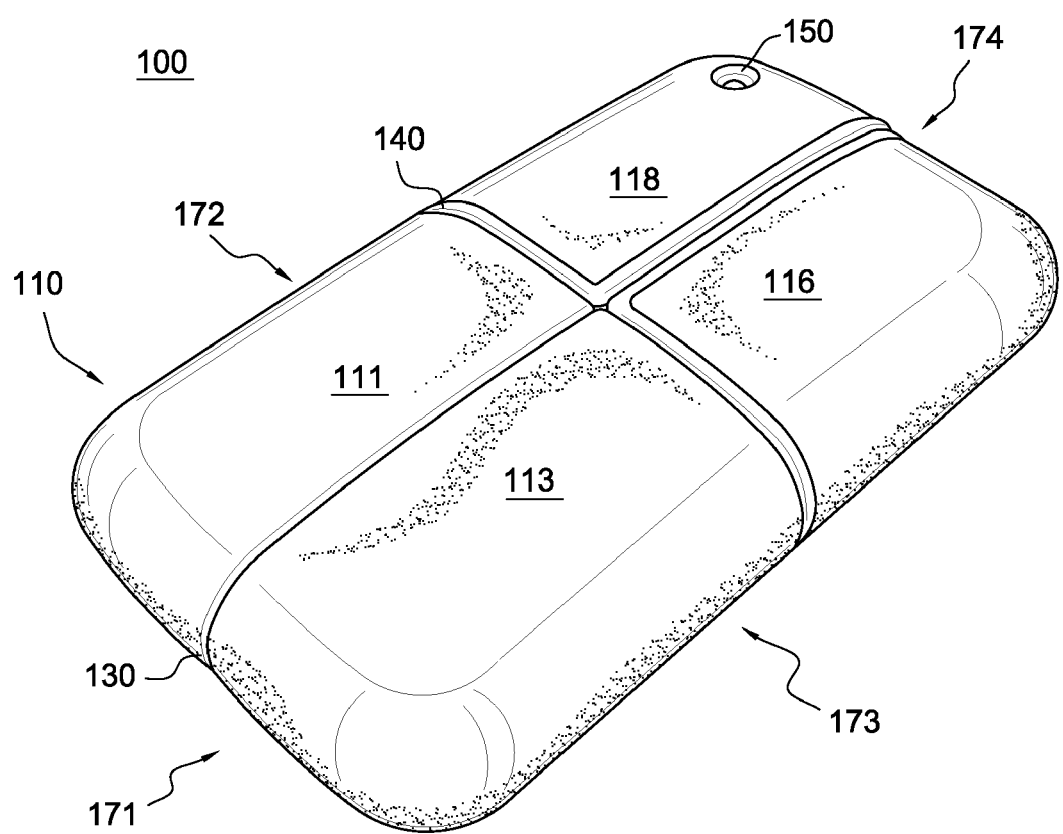
FIG. 1 is a perspective exterior backside view illustrating an embodiment of an exemplary case device for providing protection of a mobile digital media device, in accordance with the subject matter described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

In some examples, a mobile media device case can include: (a) a first portion, the first portion of the mobile media device case having a first interior side and a first exterior side, the first portion has a rectangular configuration, the first portion comprising a first top edge, a first right edge, a first left edge and a first bottom edge, the first interior side having a first interior plane portion and a first interior remainder portion, the first interior plane portion of the first interior side of the first portion is configured to form a first plane defined by the first right edge and the first bottom edge and further configured to receive a first portion of a back of a mobile media device, the first interior remainder portion of the first interior side of the first portion configured to rise away from the first interior plane portion of the first interior side of the first portion and defined by the first top edge and the first left edge, the first top edge configured to receive a first section of a top side of the mobile media device and the first left edge configured to receive a first section of a left side of the mobile media device; (b) a second portion, the second portion of the mobile media device case having a second interior side and a second exterior side, the second portion has a rectangular configuration, the second portion including a second top edge, a second right edge, a second left edge and a second bottom edge, the second interior side having a second interior plane portion and a second interior remainder portion, the second interior plane portion of the second interior side of the second portion configured to form a second plane defined by the second left edge and the second bottom edge and further configured to receive a second portion of the back of the mobile media device, the second interior remainder portion of the second interior side of the second portion configured to rise away from the second interior plane portion of the second interior side of the second portion and defined by the second top edge and the second right edge, the second top edge configured to receive a second section of the top side of the mobile media device and the second right edge configured to receive a second section of a right side of the mobile media device; (c) a third portion, the third portion of the mobile media device case having a third interior side and a third exterior side, the third portion has a rectangular configuration, the third portion including a third top edge, a third right edge, a third left edge and a third bottom edge, the third interior side having a third interior plane portion and a third interior remainder portion, the third interior plane portion of the third interior side of the third portion configured to form a third plane defined by the third right edge and the third top edge and further configured to receive a third portion of the back of the mobile media device, the third interior remainder portion of the third interior side of the third portion configured to rise away from the third interior plane portion of the third interior side of the third portion and defined by the third bottom edge and the third left edge, the third bottom edge configured to receive a third section of a bottom side of the mobile media device and the third left edge configured to receive a third section of the left side of the mobile media device; and (d) a fourth portion, the fourth portion of the mobile media device case having a fourth interior side and a fourth exterior side, the fourth portion has a rectangular configuration, the fourth portion including a fourth top edge, a fourth right edge, a fourth left edge and a fourth bottom edge, the fourth interior side having a fourth interior plane portion and a fourth interior remainder portion, the fourth interior plane portion of the fourth interior side of the fourth portion configured to form a plane defined by the fourth left edge and the fourth top edge and further configured to receive a portion of the back of the mobile media device, the fourth interior remainder portion of the fourth interior side of the fourth portion configured to rise away from the fourth interior plane portion of the fourth interior side of the fourth portion and defined by the fourth bottom edge and the fourth right edge, the fourth bottom edge configured to receive a fourth section of the bottom side of the mobile media device and the fourth right edge configured to receive a fourth section of the right side of the mobile media device. The first right edge of the first portion of the mobile media device case is elastically coupled to the second left edge of the second portion of the mobile media device case. The first bottom edge of the first portion of the mobile media device case is elastically coupled to the third top edge of the third portion of the mobile media device case. The second bottom edge of the second portion of the mobile media device case is elastically coupled to the fourth top edge of the fourth portion of the mobile media device case. The third right edge of the third portion of the mobile media device case is elastically coupled to the fourth left edge of the fourth portion of the mobile media device case.

In another embodiment, a mobile media device enclosure can include: (a) an enclosure having an interior, an exterior, a top side, a bottom side, a right side, and a left side, the interior configured to form a cavity, the cavity is sized to retain a mobile media device therein; (b) a vertical boundary, the vertical boundary having a substantially vertical orientation and configured to substantially bisect the mobile media device enclosure from the top side to the bottom side; and (c) a horizontal boundary, the horizontal boundary having a substantially horizontal orientation and configured to substantially bisect the mobile media device enclosure from the left side to the right side. The vertical boundary and the horizontal boundary are further configured to substantially divide the mobile media device enclosure into four sections. Each of the four sections is elastically coupled to two other sections of the four sections.

Still further embodiments concern a method of using a mobile media device enclosure with a mobile media device. The method can include: providing the mobile media device enclosure to include: (a) a first case section; (b) a second case section moveably coupled to the first case section; (c) a third case section moveably coupled to the first case section; and (d) a fourth case section moveably coupled to the second case section and the third case section; coupling the mobile media device to the mobile media device enclosure; uncoupling the second case section and the fourth case section from the mobile media device; and placing the second case section, the fourth case section, and a first side of the mobile media device on a surface such that the mobile media device is in a first landscape viewing mode.

Yet further embodiments concern a method of providing a mobile media device enclosure configured to hold a mobile media device. The method including: providing four or more case sections; elastically coupling a first case section of the four or more case sections to a second case section of the four or more case sections; elastically coupling the first case section of the four or more case sections to a third case section of the four or more case sections; elastically coupling the second case section of the four or more case sections to a fourth case section of the four or more case sections; and elastically coupling the third case section of the four or more case sections to the fourth case section of the four or more case sections. The four or more case sections are configured such that a first two of the four or more case section can be moved relative a second two of the four or more case sections to form a stand for the mobile media device.

FIG. 1 illustrates a perspective back-side view of an embodiment of an exemplary case device for providing protection of a mobile digital media device and configurable as a viewing platform capable of providing multiple viewing angles. FIG. 1 illustrates a mobile digital media case system 100 that includes a mobile media device enclosure or mobile digital media device case 110. Mobile digital media device case 110 includes: (a) two or more case sections 111, 113, 116, and 118 partially defined by vertical boundary 130 and horizontal boundary 140. In some examples, case section 118 can include camera lens well 150, which allows mobile digital media device camera functionality.

Each of the case sections 111, 113, 116 and 118 are configured to have an exterior portion (illustrated in FIG. 1) and an interior portion (illustrated in FIGS. 2 and 3) and at least two defined edges with each of the defined edges configured to fixedly contact (described below) an associated defined edge of one of the other three case sections. In one embodiment, each of the case sections 111, 113, 116 and 118 is configured in a substantially rectangular shape having at least two defined edges defined by vertical boundary 130 and horizontal boundary 140 (described below). Further to some embodiments, each of the defined edges of each of the case sections 111, 113, 116 and 118 is configured to fixedly contact a defined edge of one of the other case sections 111, 113, 116 and 118.

As illustrated in FIG. 1, each of the case sections 111, 113, 116 and 118 is a physically separate and distinct portion of mobile digital media device case 110. In one embodiment, each case section is configured as a quadrant of mobile digital media device case 110 having four edges with two of the four edges partially defined by vertical boundary 130 and horizontal boundary 140. Together, a substantial portion of each of case sections 111, 113; 116 and 118, including the portions or edges proximate vertical boundary 130 and horizontal boundary 140, form an interior plane or surface (not shown, but described below in reference to FIG. 2). The interior plane or surface is configured to receive the back side of a mobile digital media device.

In many embodiments, the widths of vertical boundary 130 and horizontal boundary 140 are minimal. As an example, the width of vertical boundary 130 can be the perpendicular distance between case sections 111 and 113 and between case sections 116 and 118. The width of horizontal boundary 140 can be the perpendicular distance between case sections 111 and 118 and between 113 and 116. Additionally, the remaining portion of each section, including the remaining two edges of each of case sections 111, 113, 116 and 118, are configured to rise away from the interior plane or surface of digital media device case 110. The remaining portion of each of the sections is further configured, when the case sections are fixedly contacting one another, to enclose the sides of an appropriately sized mobile digital media device, including a small portion of the perimeter of the front of mobile digital media device. In some embodiments, enclosing the back, sides, and a small portion of the perimeter of the front of mobile digital media device retains the mobile digital media device within the cavity formed by the interior plane or surface and the edges of the case sections 111, 113, 116, and 118. In an example, the remaining portion of each of the sections, including the remaining two edges of each case section 111, 113, 116 and 118, are curvilinearly configured to rise away from the interior plane or surface of digital media device case 110.

In this embodiment and as further described below, each of the case sections 111, 113, 116, and 118 is elastically coupled to two other case sections. In an example, case section 113 is configured in a substantially rectangular shape having at least two edges defined by vertical boundary 130 and horizontal boundary 140 and is located at the lower right quadrant of mobile digital media device case 110 in FIG. 1. Further to this example, case section 111 is configured in a substantially rectangular shape having at least two edges defined by vertical boundary 130 and horizontal boundary 140 and is located at the lower left quadrant of mobile digital media device case 110 in FIG. 1. Case section 116 is configured in a substantially rectangular shape having at least two edges defined by vertical boundary 130 and horizontal boundary 140 and is located at the upper right quadrant of mobile digital media device case 110 in FIG. 1. Case section 118 is configured in a substantially rectangular shape having at least two edges defined by vertical boundary 130 and horizontal boundary 140 and is located at the upper left quadrant of mobile digital media device case 110 in FIG. 1.

In the same of different example, the edge of case section 113 that is defined by vertical boundary 130 is configured to fixedly contact and be in user controlled physical communication with the edge of case section 111 that also is defined by vertical boundary 130. Similarly, the edge of case section 113 that is defined by horizontal boundary 140 is configured to fixedly contact and be in user controlled physical communication with the edge of case section 116 that also is defined by horizontal boundary 140. The edge of case section 111 that is defined by horizontal boundary 140 is configured to fixedly contact and be in user controlled physical communication with the edge of case section 118 that also is defined by horizontal boundary 140. Also, the edge of the case section 118 that is defined by vertical boundary 130 is configured to fixedly contact and be in user controller physical communication with the edge of case section 116 that is also defined by vertical boundary 130. In one embodiment and as further described below, the interior edges, the exterior edges, or both of the case sections are elastically coupled to one another.

Figure 2:
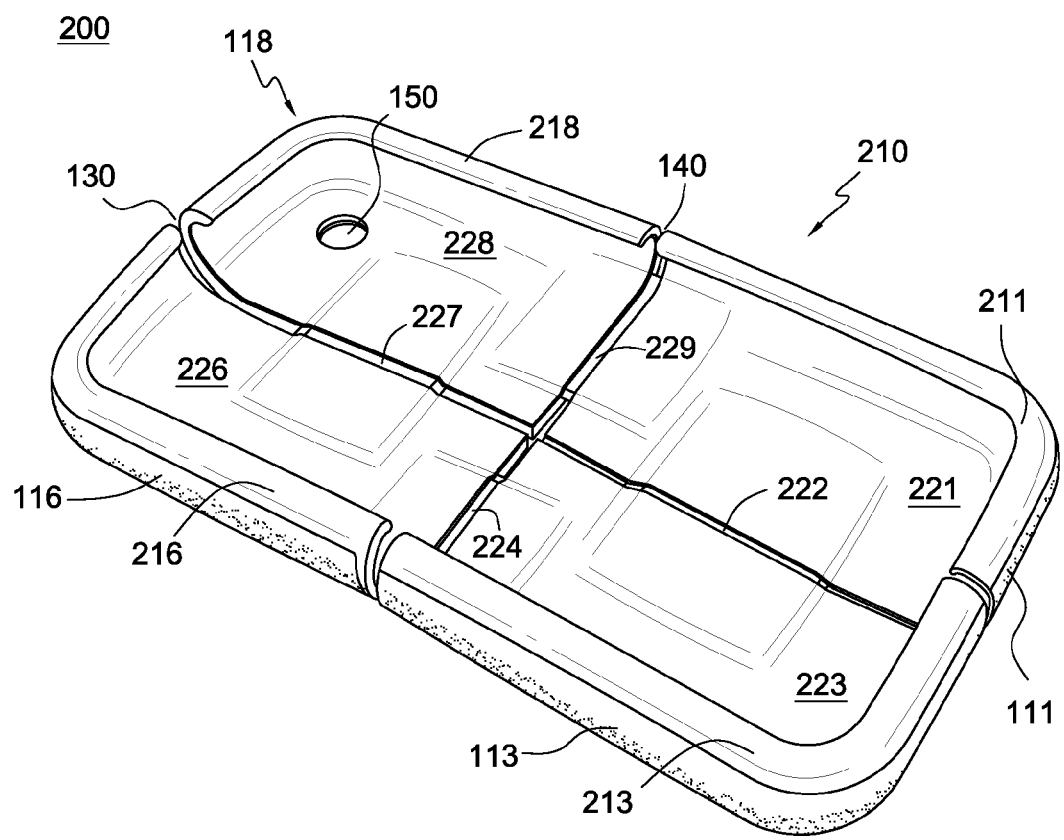
FIG. 2 is a perspective front-side view illustrating an interior view of the exemplary case device of FIG. 1 in accordance with the subject matter described herein.

FIG. 2 illustrates a perspective inside view of mobile digital media case system 200 that includes mobile digital media device case 210. In one embodiment, mobile digital media case system 200 and mobile digital media device case 210 in FIG. 2 can be same as mobile digital media case system 100 and mobile digital media device case 110 in FIG. 1. FIG. 2 shows a perspective inside view while FIG. 1 shows a perspective backside view of the system and case.

Mobile digital media device case 210 includes: case sections 111, 113, 116 and 118 partially defined by vertical boundary 130 and horizontal boundary 140, case section couplers 222, 224, 227 and 229, and camera lens well 150. Each of case sections 111, 113, 116 and 118 includes an associated one of case section moldings 211, 213, 216 and 218 as well as an associated one of case section interiors 221, 223, 226 and 228. Items identified with substantially similar numbering as in previous figures function in a substantially similar way.

In FIG. 2, each case section molding is coupled to the two exterior edges of the associated case section and configured to extend toward an associated interior edge so as to contact a minimal portion of the mobile digital media device when the mobile digital media device is received in mobile digital media device case 210. The coupling can be mechanical, chemical, physical, or the like. In operation and detailed in FIG. 4 below, the case section moldings 211, 213, 216 and 218 are configured to maintain the mobile digital media device within mobile digital media device case 210. As with case sections 111, 113, 116 and 118, each case section interior 221, 223, 226 and 228 includes two interior edges at least partially defined by vertical boundary 130 and horizontal boundary 140. Each case section interior 221, 223, 226, and 228 additionally includes a portion along each interior edge to couple to a similar interior edge of an associated case section interior. The coupling can be similar to or different from the coupling between the case section molding and the two exterior edges of the associated case section, as described above. Each such portion of the case section interior is mechanically coupled to an associated case coupler that is in turn mechanically coupled to a portion of an associated case section interior.

In one embodiment, case section interior 221 includes a portion along the interior edge defined by vertical boundary 130 that is mechanically coupled to case section coupler 222 that is in turn mechanically coupled to the portion of case section interior 223 along the associated interior edge that also is defined by vertical boundary 130. Similarly, case section interior 226 includes a portion along the interior edge defined by vertical boundary 130 that is mechanically coupled to case section coupler 227 that is in turn mechanically coupled to the portion of case section interior 228 along the associated interior edge that also is defined by vertical boundary 130. Further to this embodiment, case section interior 221 includes a portion along the interior edge defined by horizontal boundary 140 that is mechanically coupled to case section coupler 229 that is in turn mechanically coupled to a portion of case section interior 228 along the associated interior edge that also is defined by horizontal boundary 140. Similarly, case section interior 223 includes a portion along the interior edge defined by horizontal boundary 140 that is mechanically coupled to case section coupler 224 that is in turn mechanically coupled to another portion of case section interior 226 along the associated interior edge that also is defined by horizontal boundary 140. In the same or a different embodiment, other portions of case sections 111, 113, 116, and 118 can also be mechanically coupled together by the same case section couplers that mechanically couple together case section interiors 221, 223, 226, and 228, or the case section couplers can mechanically couple together exterior portions of case sections 111, 113, 116, and 118 instead of case section interiors 221, 223, 226, and 228. In one embodiment, the width of vertical boundary 130 and horizontal boundary 140 is variable depending on the type of material from which the case section couplers are manufactured.

As an example, the overall construction of mobile digital media device cases 110 and 210 in FIGS. 1 and 2, respectively, can include: (a) a polycarbonate case with or without laminated materials; (b) polycarbonate pieces coupled together by stretching joints; and/or (c) a skeleton frame with laminated exterior and interior surfaces and stretching joints. In some embodiments, the exterior portions of case sections 111, 113, 116, and 118 (FIG. 1) can comprise leather, synthetic leather, woven fabrics (e.g., nylon, canvas, etc.), and/or the like. Also, in the same or different embodiments, the interior portions of case sections 111, 113, 116, and 118 (e.g., case section interiors 221, 223, 226 and 228) can comprise microfiber, satin, linen, and/or the like. Furthermore, in the same or different embodiments, the skeleton frame or case section moldings can comprise polycarbonate or the like, and can support the exterior and interior portions of the case sections. Moreover, in the same or different embodiments, the stretch joint material or case section couplers can comprise one or more elastic materials, silicone, and/or one or more thermoplastic elastomers. Additionally, in the same or different embodiments, the stretch joint material can be stitched and/or glued to the interior and/or or exterior portions of the case sections, and/or the stretch joint material can be glued, heat welded, and/or co-molded to the skeleton frame.

Figure 3:
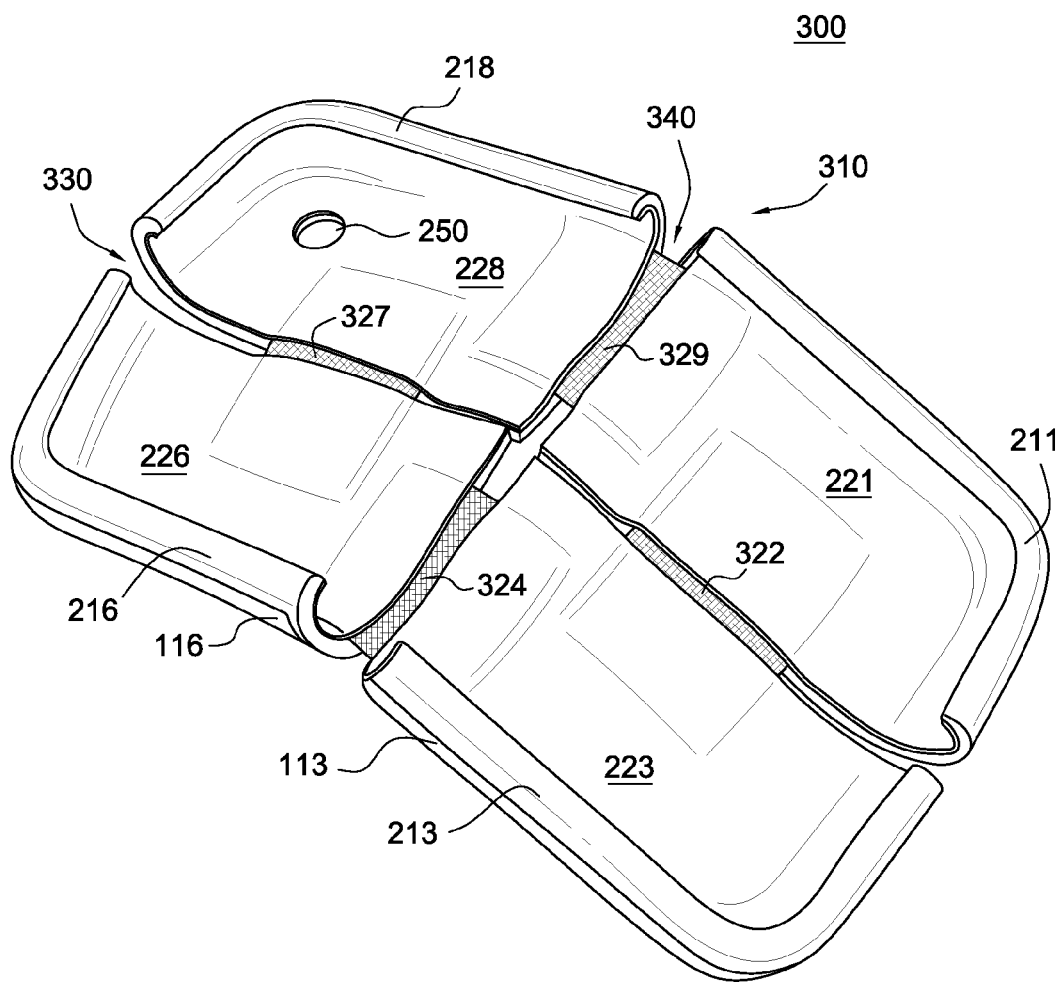
FIG. 3 is a perspective front-side view illustrating an inside view of the exemplary case device of FIG. 1 in accordance with the subject matter described herein.

FIG. 3 illustrates a perspective inside view of mobile digital media case system 300 that includes mobile digital media device case 310 positioned to receive a mobile digital media (not shown). Mobile digital media device case 310 includes: case sections 111, 113, 116 and 118 partially defined by vertical boundary 330 and horizontal boundary 340, case section couplers 322, 324, 327 and 329, and camera lens well 150. Each of case sections 111, 113, 116 and 118 includes an associated one of case section moldings 211, 213, 216 and 218 as well as an associated one of case section interiors 221, 223, 226 and 228. Items identified with substantially similar numbering as in previous figures function in a substantially similar way.

In FIG. 3, each of case section interiors 221, 223, 226 and 228 includes two interior edges at least partially defined by vertical boundary 330 and horizontal boundary 340. In FIG. 3, vertical boundary 330 and horizontal boundary 340 are configured to have an increased width when mobile digital media device case 310 is positioned to receive a mobile digital media. As shown in FIG. 3, vertical boundary 330 and horizontal boundary 340 have larger widths than the widths of vertical boundary 130 and horizontal boundary 140 in FIGS. 1 and 2 because the case section couplers of FIG. 3 are pulled apart or expanded. In operation, mobile digital media device case 310 is configured to receive a mobile digital media device (not shown) when force is applied to case sections 111, 113, 116 and 118 in such a way as to separate the interior edges of the case sections from one another. When the force is applied, the physical integrity of the case is maintained in an expanded state by section couplers 322, 324, 327 and 329.

Figure 4:
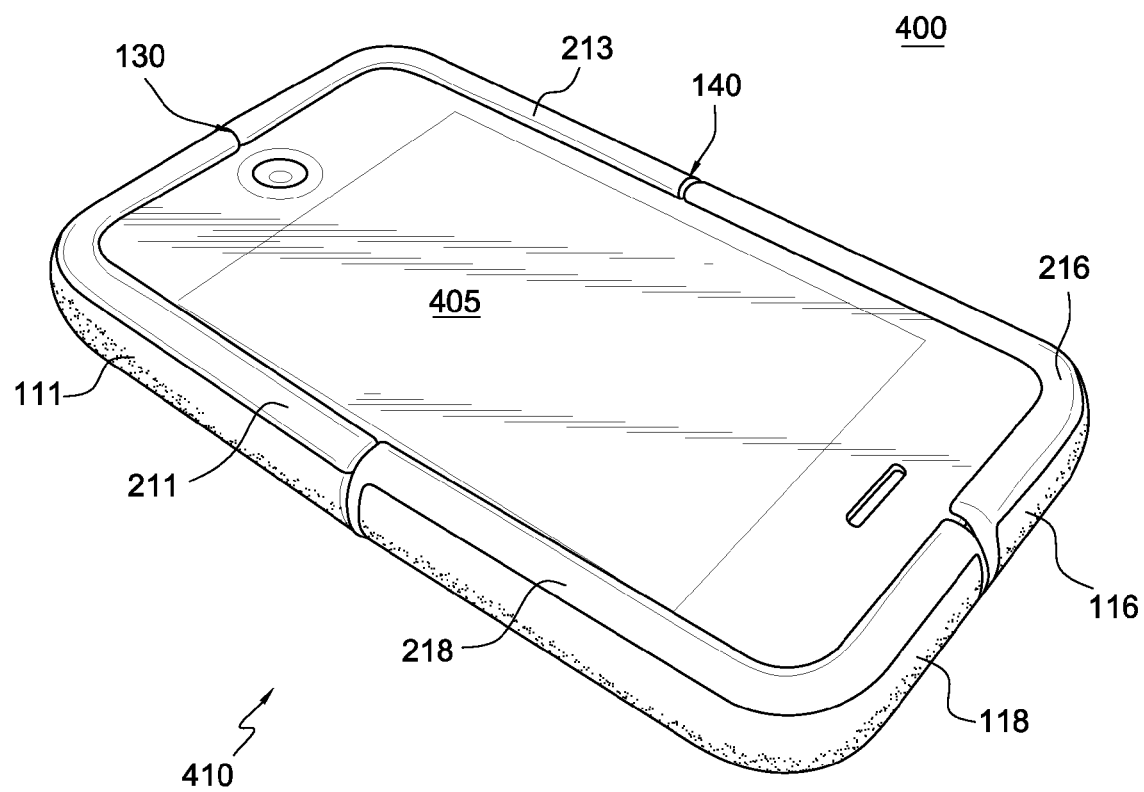
FIG. 4 is a perspective front-side view illustrating the exemplary case device of FIG. 1 coupled to a mobile digital media device, in accordance with the subject matter described herein.

FIG. 4 illustrates a perspective view of mobile digital media case system 400 that includes mobile digital media device case 410 coupled to a mobile digital media device 405. Mobile digital media device case 410 includes: case sections 111, 113 (not shown), 116, and 118 partially defined by vertical boundary 130 and horizontal boundary 140, and case section moldings 211, 213, 216, and 218. Items identified with substantially similar numbering as in previous figures function in a substantially similar way.

In some embodiments, mobile digital media device 405 is enclosed within mobile digital media device case 410 by case section interiors (not shown, but described above) and associated case section moldings 211, 213, 216 and 218. In an example, the section couplers (not shown, but detailed described above) that are mechanically coupled to the case section interiors provide sufficient tension so that the case section interiors form an enclosure around mobile digital media device 405.

Figure 5:
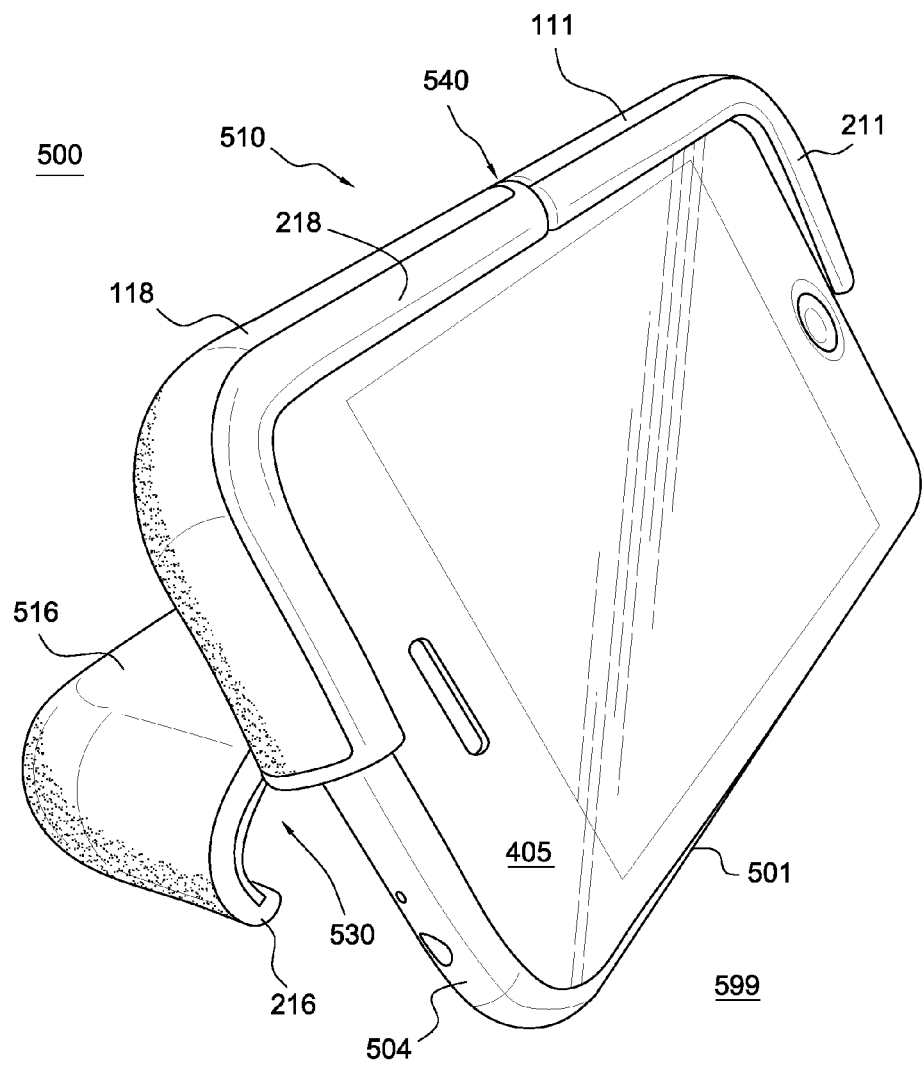
FIG. 5 is a perspective front-side view illustrating the exemplary case device of FIG. 1 positioned in a landscape viewing format and coupled to the mobile digital media device of FIG. 4, in accordance with the subject matter described herein.

FIG. 5 illustrates a frontal perspective view of mobile digital media case system 500 that includes mobile digital media device case 510 positioned in a landscape viewing format that also includes a stand formed from portions of digital media device case 510. Mobile digital media device case 510 includes: case sections 111, 118, and 516 partially defined by vertical boundary 530 and horizontal boundary 540, and associated case section moldings 211, 216 and 218. Items identified with substantially similar numbering as in previous figures function in a substantially similar way. Although not shown in FIG. 5, mobile digital media device case 510 can also include a fourth case section 613 (FIG. 6) and a fourth case section molding, similar to the mobile digital media device cases described in FIGS. 1-4.

In some embodiments, mobile digital media device 405 is partially enclosed within mobile digital media device case 510 that is configured as a viewing stand allowing a user to view mobile digital media device 405 in landscape mode. In one embodiment, a portion of mobile digital media device 405 is used as part of the base when mobile digital media device case 510 is configured as a viewing stand. In an example and referring to FIG. 5, case section 516 and an associated case section (case section 613 of FIG. 6, below) are configured to separate from a portion of mobile digital media device 405 and fold back at an angle along the axis defined by vertical boundary 530 exposing one of the longer sides, side 501, of mobile digital media device 405. Further to this example, the exposed edge of side 501 of mobile digital media device 405 in conjunction with case section 516 and the associated case section (case section 613 of FIG. 6, below) form the base of mobile digital media device case 510 with the remaining edge of the opposite longer side of mobile digital media device 405 remaining within mobile digital media device case 510 and secured by case sections 111 and 118.

Figure 6:
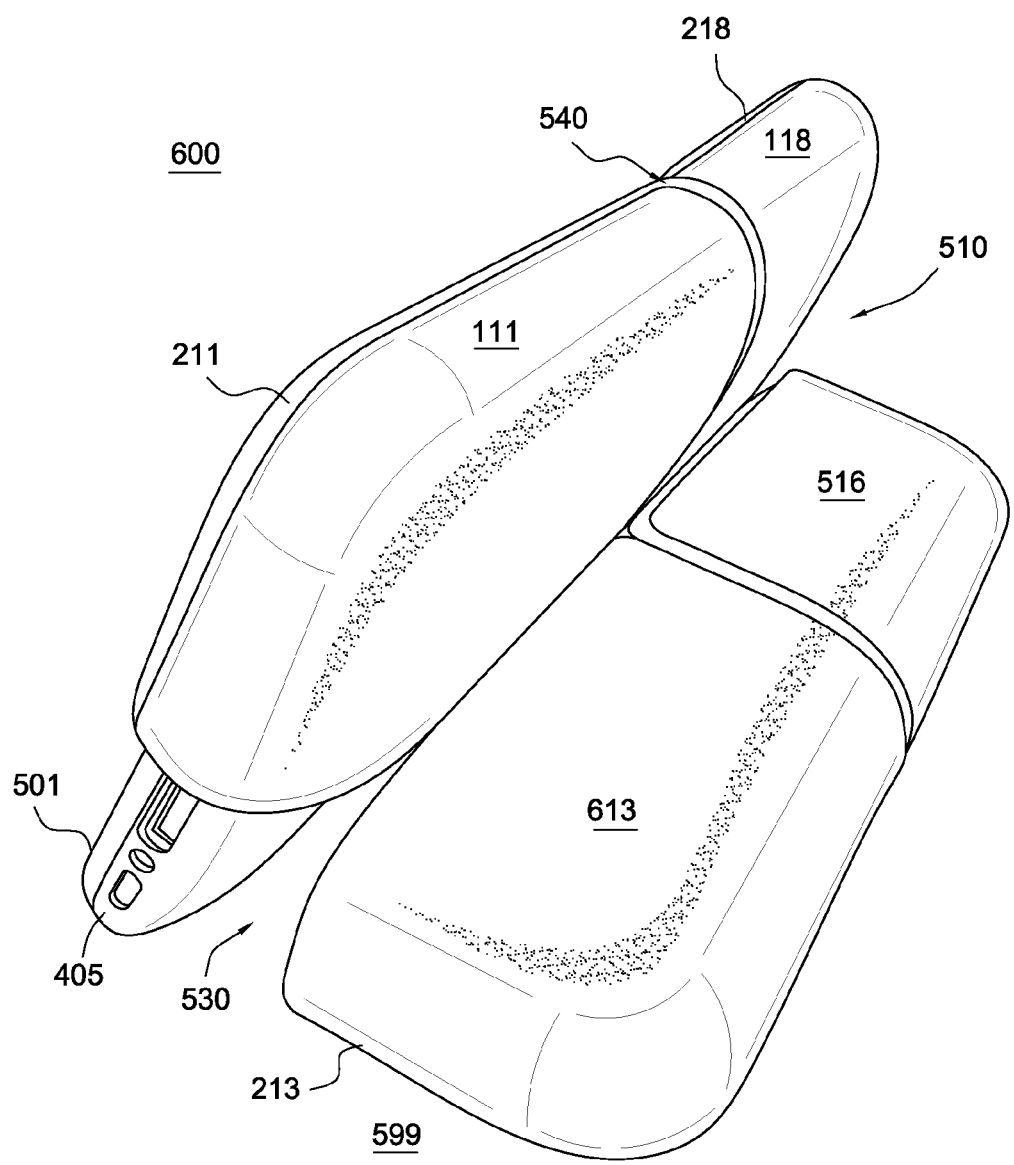
FIG. 6 is a perspective rear-side view the exemplary case device of FIG. 1 positioned in the landscape viewing format and coupled to the mobile digital media device of FIG. 4, in accordance with the subject matter described herein.

FIG. 6 illustrates a rear perspective view of mobile digital media case system 600 that includes mobile digital media device case 510 positioned in a landscaped viewing format and that also includes a stand formed from portions of digital media device case 610. In FIG. 6, mobile digital media case system 600 is a rear-view illustration of mobile digital media case system 500 of FIG. 5. Mobile digital media device case 510 includes case sections 111, 118, 516 and 613 partially defined by vertical boundary 530 and horizontal boundary 540, and also includes associated case section moldings 211, 213 and 218. Items identified with substantially similar numbering as in previous figures function in a substantially similar way.

As in FIG. 5, mobile digital media device 405 is partially enclosed within mobile digital media device case 510 that is configured as a viewing stand allowing a user to view mobile digital media device 405 in landscape mode. In one embodiment, a portion of mobile digital media device 405 is used as part of the base when mobile digital media device case 510 is configured as a viewing stand. In an example and referring to FIG. 6, case sections 516 and 613 are configured to detach from a portion of mobile digital media device 405 and fold back at an angle along the axis defined by vertical boundary 530 exposing one of the longer sides, side 501, of mobile digital media device 405. Further to this example and as described in FIG. 5 above, the exposed edge of side 501 of mobile digital media device 405 in conjunction with case sections 516 and 613 form the base of mobile digital media device case 510 with the remaining edge of the opposite longer side of mobile digital media device 405 remaining within mobile digital media device case 510 and secured by case sections 111 and 118.

Figure 7:
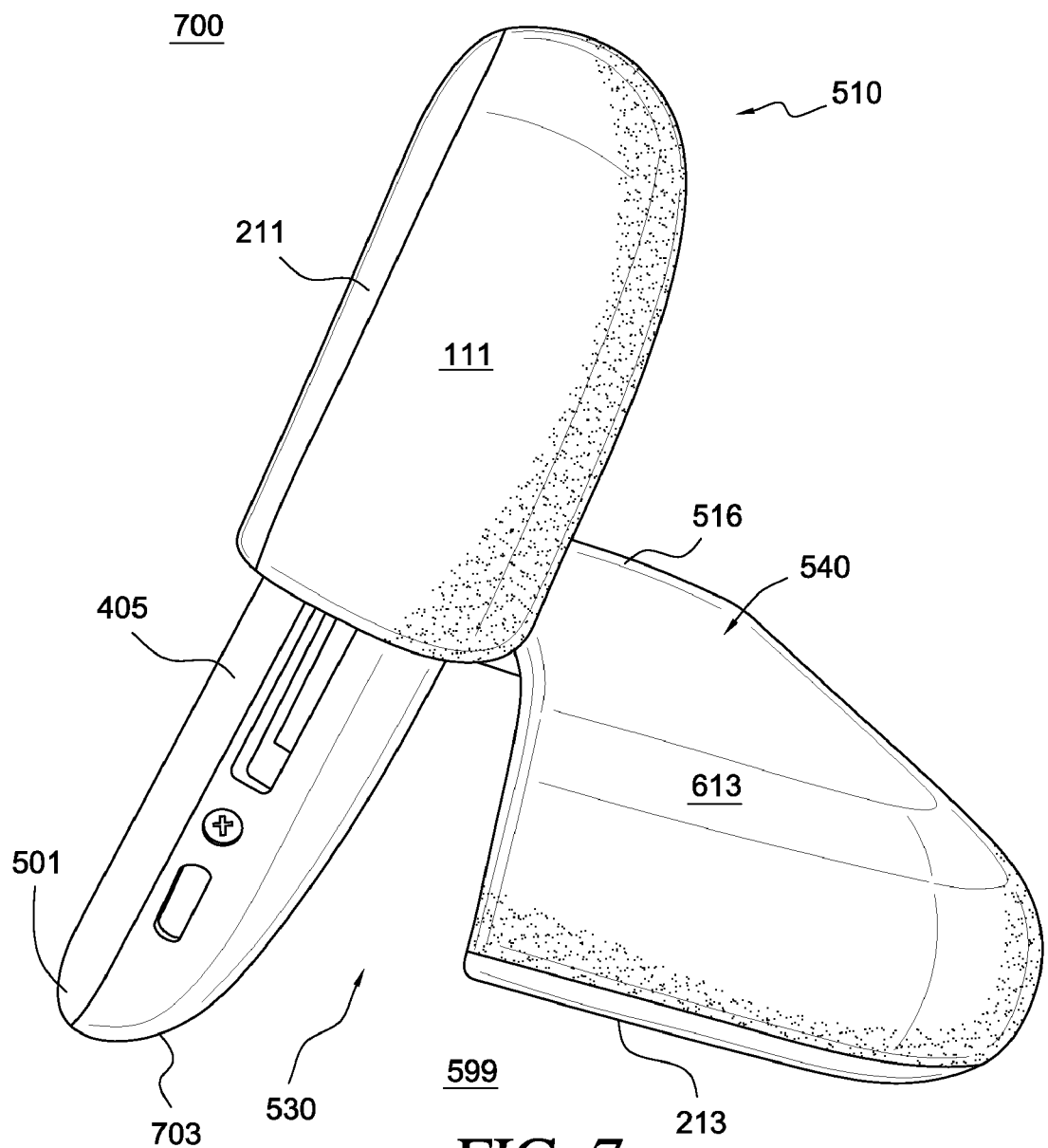
FIG. 7 is a right-side view the exemplary case device of FIG. 1 positioned in the landscape viewing format and coupled to the mobile digital media device of FIG. 4, in accordance with the subject matter described herein.

FIG. 7 illustrates a right-angle view of mobile digital media case system 700 that includes mobile digital media device case 710 positioned in a landscaped viewing format and that also includes a stand formed from portions of digital media device case 710. In FIG. 7, mobile digital media case system 700 is a right-angle illustration, along the bottom of mobile digital media device 405, of mobile digital media case system 500 of FIG. 5. In other embodiments, the angle between case sections 111 and 113 can be approximately 30-150 degrees. In the embodiment shown in FIG. 7, the angle is approximately 90 degrees. Items identified with substantially similar numbering as in previous figures function in a substantially similar way. As in FIG. 5, mobile digital media device 405 is partially enclosed within mobile digital media device case 510, which is configured as a viewing stand allowing a user to view mobile digital media device 405 in landscape mode.

Figure 8:
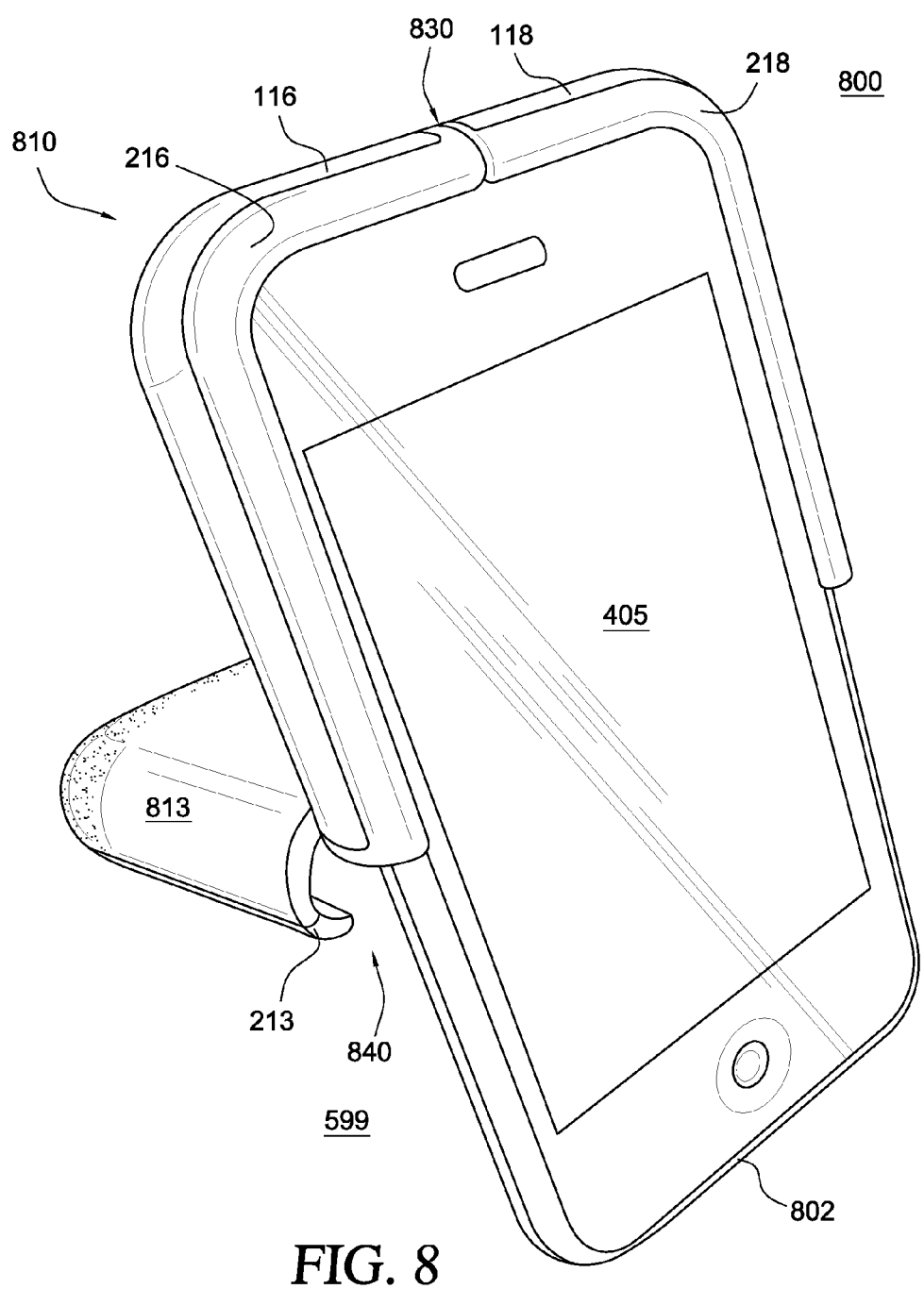
FIG. 8 is a perspective rear-side view illustrating the exemplary case device of FIG. 1 positioned in a portrait viewing format and coupled to the mobile digital media device of FIG. 4, in accordance with the subject matter described herein.

FIG. 8 illustrates a frontal perspective view of mobile digital media case system 800 that includes mobile digital media device case 810 positioned in a portrait viewing format and that also includes a stand formed from portions of digital media device case 810. Mobile digital media device case 810 includes: case sections 116, 118 and 813 partially defined by vertical boundary 830 and horizontal boundary 840, and associated case section moldings 213, 216 and 218. Items identified with substantially similar numbering as in previous figures function in a substantially similar way. Although not shown in FIG. 8, mobile digital media device case 810 can also include a fourth case section and a fourth case section molding, similar to the mobile digital media device cases of FIGS. 1-4.

In some embodiments, mobile digital media device 405 is partially enclosed within mobile digital media device case 810, which is configured as a viewing stand allowing a user to view mobile digital media device 405 in portrait mode. In one embodiment, a portion of mobile digital media device 405 is used as part of the base when mobile digital media device case 810 is configured as a viewing stand. In an example and referring to FIG. 8, case section 813 and an associated case section (case section 911 of FIG. 9, below) are configured to detach from a portion of mobile digital media device 405 and fold back at an angle along the axis defined by horizontal boundary 840 exposing one of the shorter sides, side 802, of mobile digital media device 405. Further to this example, the exposed edge of side 802 of mobile digital media device 405 in conjunction with case section 813 and the associated case section (case section 911 of FIG. 9, below) form the base of mobile digital media device case 810 with the remaining edge of the opposite shorter side of mobile digital media device 405 remaining within mobile digital media device case 810 and secured by case sections 116 and 118.

Figure 9:
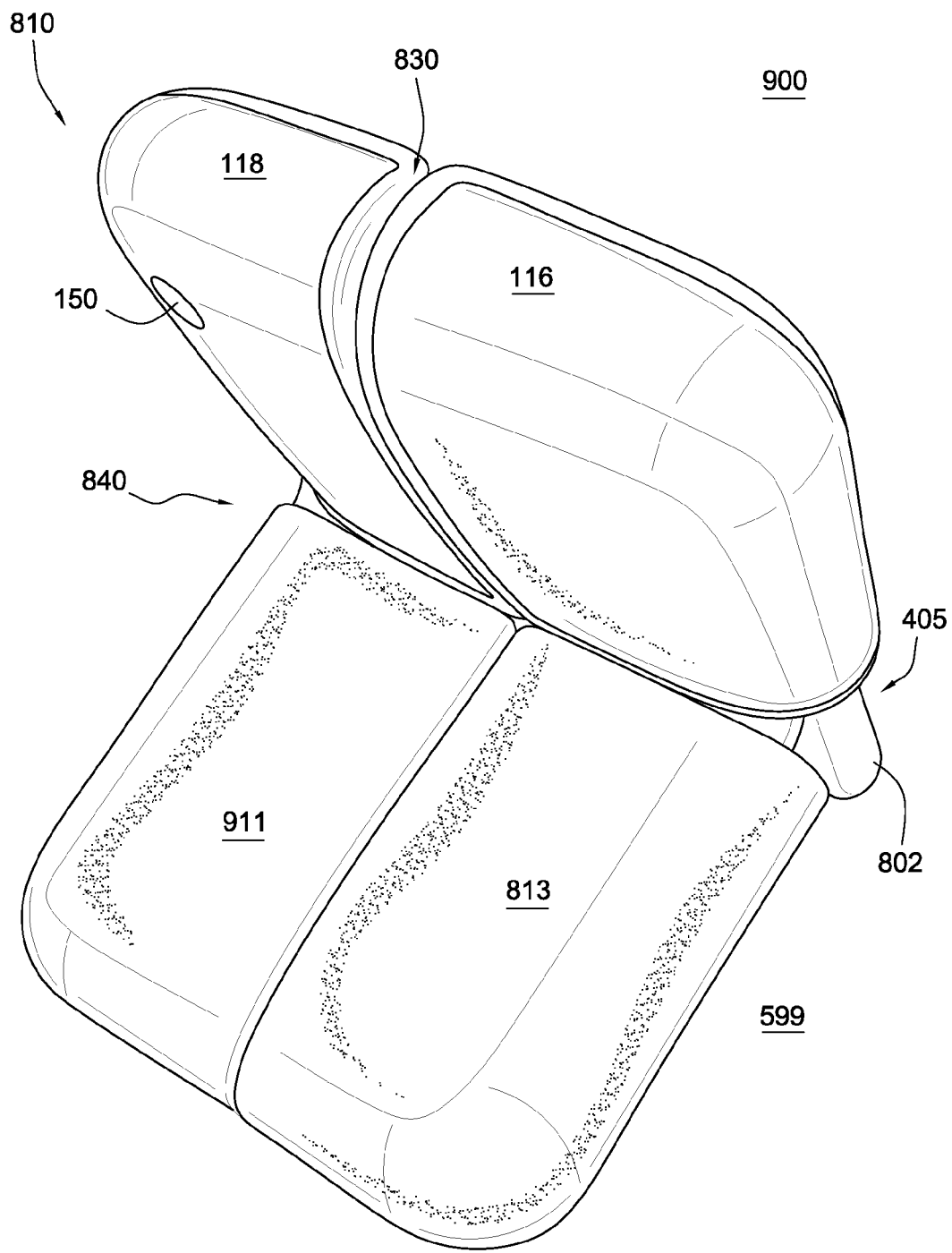
FIG. 9 is a perspective rear-side view illustrating the exemplary case device of FIG. 1 positioned in the portrait viewing format and coupled to the mobile digital media device of FIG. 4, in accordance with the subject matter described herein.

FIG. 9 illustrates a rear perspective view of mobile digital media case system 900 that includes mobile digital media device case 810 positioned in a portrait viewing format and that also includes a stand formed from portions of digital media device case 810. In FIG. 9, mobile digital media case system 900 is a rear-view illustration of mobile digital media case system 800 of FIG. 8. Mobile digital media device case 810 includes: case sections 116, 118, 813 and 911 partially defined by vertical boundary 830 and horizontal boundary 840. Items identified with substantially similar numbering as in previous figures function in a substantially similar way.

As in FIG. 8, mobile digital media device 405 is partially enclosed within mobile digital media device case 810, which is configured as a viewing stand allowing a user to view mobile digital media device 405 in portrait mode. In one embodiment, a portion of mobile digital media device 405 is used as part of the base when mobile digital media device case 810 is configured as a viewing stand. In an example and referring to FIG. 9, case sections 813 and 911 are configured to detach from a portion of mobile digital media device 405 and fold back at an angle along the axis defined by horizontal boundary 840 exposing one of the shorter sides, side 802, of mobile digital media device 405. Further to this example and as described in FIG. 8 above, the exposed edge of side 802 of mobile digital media device 405 in conjunction with case sections 813 and 911 form the base of mobile digital media device case 810 with the remaining edge of the opposite shorter side of mobile digital media device 405 remaining within mobile digital media device case 810 and secured by case sections 116 and 118.

Figure 10:
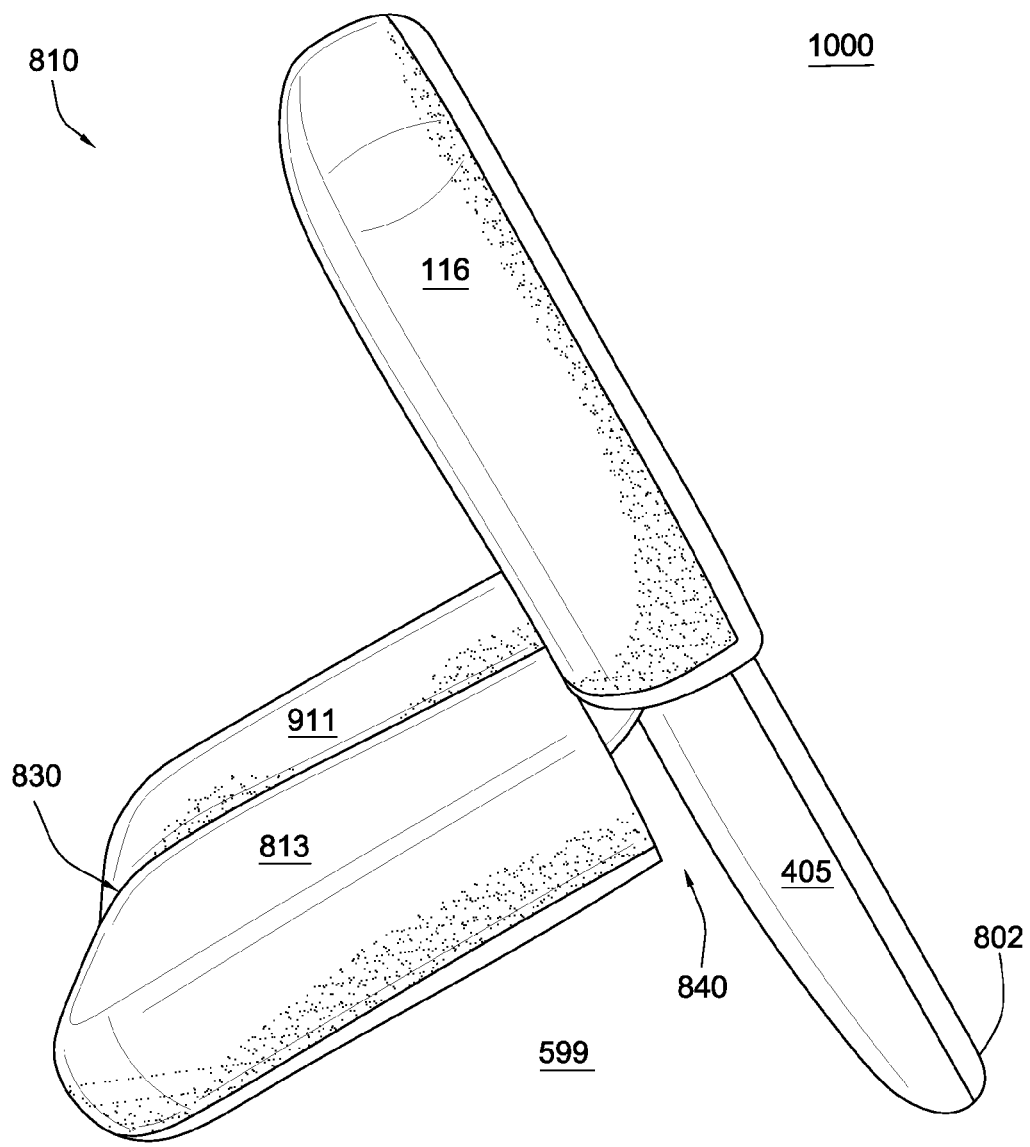
FIG. 10 is a left-side view illustrating the exemplary case device of FIG. 1 positioned in the portrait viewing format and coupled to the mobile digital media device of FIG. 4, in accordance with the subject matter described herein.

FIG. 10 illustrates a right-angle-view of mobile digital media case system 1000 that includes mobile digital media device case 810 positioned in a portrait viewing format and that also includes a stand formed from portions of digital media device case 810. In FIG. 10, mobile digital media case system 1000 is a right-angle illustration, along one of the long sides of mobile digital media device 405, of mobile digital media case system 800 of FIG. 8. In other embodiments, the angle between case sections 116 and 813 can be approximately 30-150 degrees. In the embodiment shown in FIG. 10, the angle is approximately 90 degrees. Items identified with substantially similar numbering as in previous figures function in a substantially similar way. As in FIG. 8, mobile digital media device 405 is partially enclosed within mobile digital media device case 810, which is configured as a viewing stand allowing a user to view mobile digital media device 405 in portrait mode.

Figure 11:
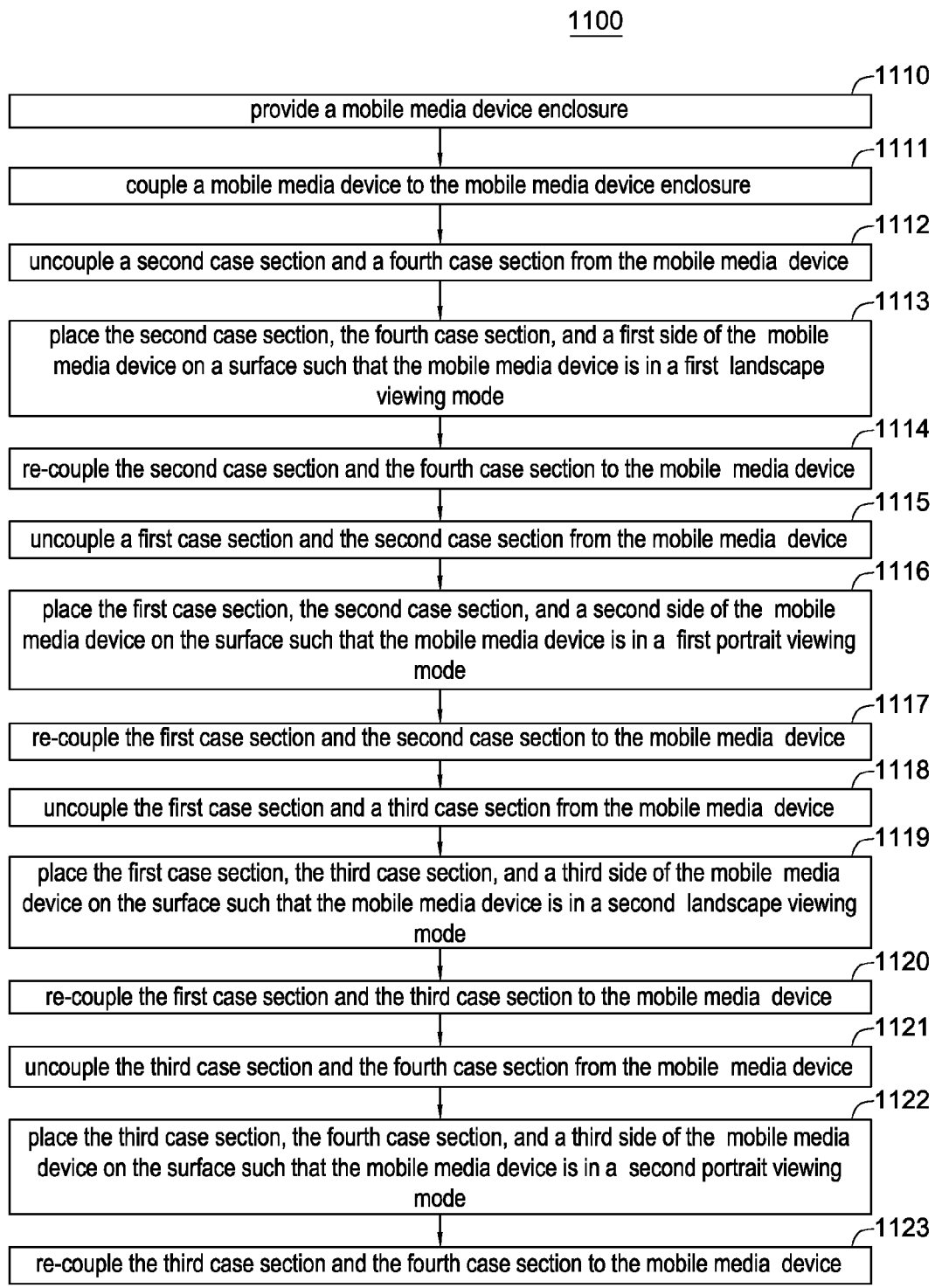
FIG. 11 is a flow chart illustrating a method of using an exemplary case device, in accordance with the subject matter described herein.

FIG. 11 illustrates a flow chart for an embodiment of a method 1100 of using a mobile media device enclosure with a mobile media device. Method 1100 is merely exemplary and is not limited to the embodiments presented herein. Method 1100 can be employed in many different embodiments or examples not specifically depicted or described herein. In some embodiments, the activities, the procedures, and/or the processes of method 1100 can be performed in the order presented. In other embodiments, the activities, the procedures, and/or the processes of the method 1100 can be performed in any other suitable order. In still other embodiments, one or more of the activities, the procedures, and/or the processes in method 1100 can be combined or skipped.

Referring to FIG. 11, method 1100 includes an activity 1110 of providing a mobile media device enclosure. In some examples, activity 1110 can include providing the mobile media device enclosure to include: (a) a first case section; (b) a second case section moveably coupled to the first case section; (c) a third case section moveably coupled to the first case section; (d) a fourth case section moveably coupled to the second case section and the third case section. As an example, the mobile media device can be similar or identical to mobile media device cases 110, 210, 310, 410, 510, and/or 810 of FIGS. 1, 2, 3, 4, 5, and 8, respectively.

The first case section can be similar or identical to case sections 111, 221, and/or 911 of FIGS. 1, 2 and 9, respectively. The second case section can be similar or identical to case sections 113, 223, 613, and/or 813 of FIGS. 1, 2, 6, and 8, respectively. The third case section can be similar or identical to case sections 118 and/or 228 of FIGS. 1 and 2, respectively. The fourth case section can be similar or identical to case section 116, 226, and/or 516 of FIGS. 1, 2 and 5, respectively.

Method 1100 in FIG. 11 continues with an activity 1111 of coupling a mobile media device to the mobile media device enclosure. In some examples, the mobile media device can be similar or identical to mobile media device 405 of FIG. 4. In the same or different examples, the coupling of the mobile media device to the mobile media device enclosure can be similar or identical to the coupling of mobile media device 405 to mobile media device enclosure 410, as illustrated in FIGS. 3 and 4.

Subsequently, method 1100 of FIG. 11 includes an activity 1112 of uncoupling the second case section and the fourth case section from the mobile media device. In some examples, the uncoupling of the second case section and the fourth case section from the mobile media device can be similar or identical to the uncoupling of case section 516 (FIGS. 5-7) and case section 613 (FIGS. 6-7) from mobile media device 405 (FIGS. 5-7).

Next, method 1100 of FIG. 11 includes an activity 1113 of placing the second case section, the fourth case section, and a first side of the mobile media device on a surface such that the mobile media device is in a first landscape viewing mode. In some examples, placing the second case section, the fourth case section, and the first side of the mobile media device on the surface such that the mobile media device is in the first landscape viewing mode can be similar to the placement of case section 516, case section 613, and side 501 of mobile media device 405 on a surface 599, as illustrated in FIGS. 5-7.

Method 1100 in FIG. 11 continues with an activity 1114 of re-coupling the second case section and the fourth case section to the mobile media device.

Subsequently, method 1100 of FIG. 11 includes an activity 1115 of uncoupling the first case section and the second case section from the mobile media device. In some examples, the uncoupling of first case section and the second case section from the mobile media device can be similar or identical to the uncoupling of case section 911 (FIGS. 9-10) and case section 813 (FIGS. 8-10) from mobile media device 810 (FIGS. 8-10).

Next, method 1100 of FIG. 11 includes an activity 1116 of placing the first case section, the second case section, and a second side of the mobile media device on the surface such that the mobile media device is in a first portrait viewing mode. In some examples, placing the first case section, the second case section, and a second side of the mobile media device on the surface such that the mobile media device is in a first portrait viewing mode can be similar to the placement of case section 911, case section 813, and side 802 of mobile media device 405 on surface 599, as illustrated in FIGS. 8-10.

Method 1100 in FIG. 11 continues with an activity 1117 of re-coupling the first case section and the second case section to the mobile media device.

Subsequently, method 1100 of FIG. 11 includes an activity 1118 of uncoupling the first case section and the third case section from the mobile media device. For example, uncoupling the first case section and the third case section from the mobile media device can be similar or identical to uncoupling case section 111 (FIG. 1) and case section 118 (FIG. 1) from mobile media device 405 (FIG. 4).

Next, method 1100 of FIG. 11 includes an activity 1119 of placing the first case section, the third case section, and a third side of the mobile media device on the surface such that the mobile media device is in a second landscape viewing mode. In some examples, placing the first case section, the third case section, and a third side of the mobile media device on the surface such that the mobile media device is in a second landscape viewing mode can be similar to the placement of case section 111 (FIG. 1), case section 113 (FIG. 1), and a side 703 (FIG. 7) of mobile media device 405 (FIG. 4) on surface 599 (FIG. 5).

Method 1100 in FIG. 11 continues with an activity 1120 of re-coupling the first case section and the third case section to the mobile media device.

Subsequently, method 1100 of FIG. 11 includes an activity 1121 of uncoupling the third case section and the fourth case section from the mobile media device. For example, uncoupling the third case section and the fourth case section from the mobile media device can be similar or identical to uncoupling case section 118 (FIG. 1) and case section 116 (FIG. 1) from the mobile media device 405 (FIG. 4).

Next, method 1100 of FIG. 11 includes an activity 1122 of placing the third case section, the fourth case section, and a fourth side of the mobile media device on the surface such that the mobile media device is in a second portrait viewing mode. In some examples, placing the third case section, the fourth case section, and a fourth side of the mobile media device on the surface such that the mobile media device is in a second portrait viewing mode can be similar to the placement of case section 118 (FIG. 1), case section 116 (FIG. 1), and a side 504 (FIG. 5) of mobile media device 405 (FIG. 4) on surface 599 (FIG. 5).

Method 1100 in FIG. 11 continues with an activity 1123 of re-coupling the third case section and the fourth case section to the mobile media device.

Figure 12:
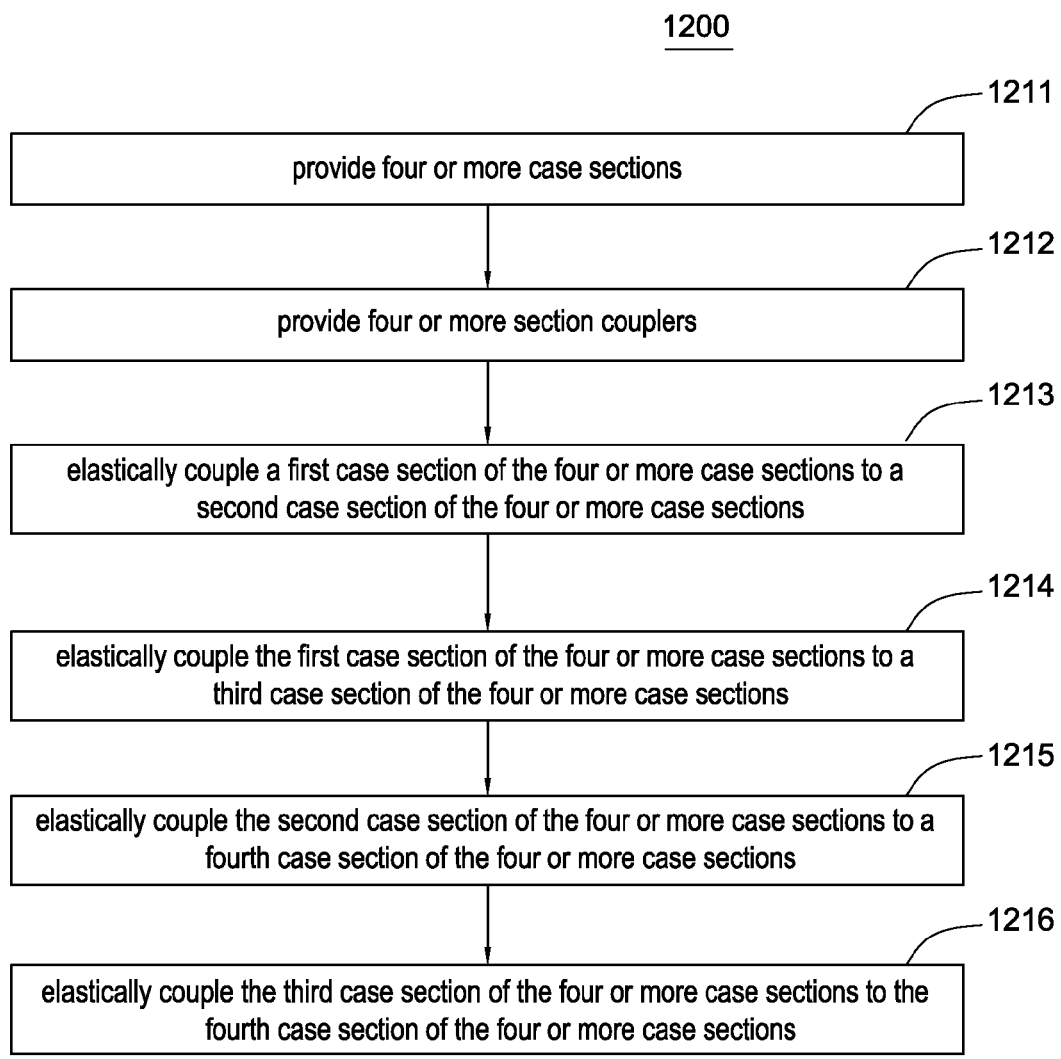
FIG. 12 is a flow chart illustrating a method of providing an exemplary case device, in accordance with the subject matter described herein.

FIG. 12 illustrates a flow chart for an embodiment of a method 1200 of providing a mobile media device enclosure configured to hold a mobile media device. Method 1200 is merely exemplary and is not limited to the embodiments presented herein. Method 1200 can be employed in many different embodiments or examples not specifically depicted or described herein. In some embodiments, the activities, the procedures, and/or the processes of method 1200 can be performed in the order presented. In other embodiments, the activities, the procedures, and/or the processes of the method 1200 can be performed in any other suitable order. In still other embodiments, one or more of the activities, the procedures, and/or the processes in method 1200 can be combined or skipped.

Referring to FIG. 12, method 1200 includes an activity 1211 of providing four or more case sections. As an example, the mobile media device can be similar or identical to mobile media device cases 110, 210, 310, 410, 510, and/or 810 of FIGS. 1, 2, 3, 4, 5, and 8, respectively.

The first case section can be similar or identical to case sections 111, 221, and/or 911 of FIGS. 1, 2 and 9, respectively. The second case section can be similar or identical to case sections 113, 223, 613, and/or 813 of FIGS. 1, 2, 6, and 8, respectively. The third case section can be similar or identical to case sections 118 and/or 228 of FIGS. 1 and 2, respectively. The fourth case section can be similar or identical to case section 116, 226, and/or 516 of FIGS. 1, 2 and 5, respectively. In some examples, one or more of the case sections can include a camera lens well. For example, the camera lens well can be similar or identical to camera lens well 150 of FIG. 1. In some examples, the four or more case sections can include polycarbonate, TPU (thermoplastic polyurethane), TPE (thermoplastic elastomer), TPR (thermoplastic rubber), leather, and/or any other suitable material.

Method 1200 in FIG. 12 continues with an activity 1212 of providing four or more section couplers. In some examples, a first section coupler of the four or more section couplers can be similar or identical to section coupler 222 and/or 322 of FIGS. 2 and 3, respectively. A second section coupler of the four or more section couplers can be similar or identical to section coupler 229 and/or 329 of FIGS. 2 and 3, respectively. A third section coupler of the four or more section couplers can be similar or identical to section coupler 224 and/or 324 of FIGS. 2 and 3, respectively. A fourth section coupler of the four or more section couplers can be similar or identical to section coupler 227 and/or 327 of FIGS. 2 and 3, respectively. In some examples, the four or more section couplers can include: stretch parts, elastic fabric, elastic webbing, silicone, and/or any other material with suitable elastic properties.

Subsequently, method 1200 of FIG. 12 includes an activity 1213 of elastically coupling a first case section of the four or more case sections to a second case section of the four or more case sections. The elastic coupling of the first case section to the second case section can be similar or identical to the elastic coupling of case section 221 and case section 223, as illustrated in FIG. 2.

In various embodiments, elastically coupling the first case section to a second case section forms a first side of the mobile media device enclosure. For example, the first side of the mobile media device case can be similar or identical to side 171 (FIG. 1) of mobile media device, enclosure 110 (FIG. 1).

In the same or different embodiments, elastically coupling the first case section to the second case section can be accomplished using the first section coupler. In some examples, a first side of the first section coupler can be mechanically or otherwise coupled to the first case section, and a second side of the first section coupler can be mechanically or otherwise coupled to the second case section. For example, the elastic coupling of the first case section to the second case section using the first section coupler can be similar or identical to the elastic coupling of case section 221 to case section 223 using section coupler 222, as illustrated in FIG. 2.

Next, method 1200 of FIG. 12 includes an activity 1214 of elastically coupling the first case section of the four or more case sections to the third case section of the four or more case sections. The elastic coupling of the first case section to the third case section can be similar or identical to the elastic coupling of case section 221 and case section 228, as illustrated in FIG. 2.

In various embodiments, the elastic coupling of the first case section to a third case section forms a second side of the mobile media device enclosure. For example, the second side of the mobile media device case can be similar or identical to side 172 (FIG. 1) of mobile media device case 110 (FIG. 1).

In the same or different embodiments, elastically coupling the first case section to the third case section can be accomplished using the second section coupler. In some examples, a first side of the second section coupler can be mechanically or otherwise coupled to the first case section, and a second side of the second section coupler can be mechanically or otherwise coupled to the third case section. For example, the elastic coupling of the first case section to the third case section using the second section coupler can be similar or identical to the elastic coupling of case section 221 to case section 228 using section coupler 229, as illustrated in FIG. 2.

Method 1200 in FIG. 12 continues with an activity 1215 of elastically coupling the second case section of the four or more case sections to the fourth case section of the four or more case sections. The elastic coupling of the second case section to the fourth case section can be similar or identical to the elastic coupling of case section 223 and case section 226, as illustrated in FIG. 2.

In various embodiments, the elastic coupling of the second case section to the fourth case section forms a third side of the mobile media device enclosure. For example, the third side of the mobile media device case can be similar or identical to side 173 (FIG. 1) of mobile media device case 110 (FIG. 1).

In the same or different embodiments, elastically coupling the second case section to the fourth case section can be accomplished using the third section coupler. In some examples, a first side of the third section coupler can be mechanically or otherwise coupled to the second case section, and a second side of the third section coupler can be mechanically or otherwise coupled to the fourth case section. For example, the elastic coupling of the second case section to the fourth case section using the third section coupler can be similar or identical to the elastic coupling of case section 223 to case section 226 using section coupler 224, as illustrated in FIG. 2.

Subsequently, method 1200 of FIG. 12 includes an activity 1216 of elastically coupling the third case section of the four or more case sections to the fourth case section of the four or more case sections. The elastic coupling of the third case section to the fourth case section can be similar or identical to the elastic coupling of case section 228 and case section 226, as illustrated in FIG. 2.

In various embodiments, the elastic coupling of the third case section to the fourth case section forms a fourth side of the mobile media device enclosure. For example, the fourth side of the mobile media device case can be similar or identical to side 174 (FIG. 1) of mobile media device case 110 (FIG. 1).

In the same or different embodiments, elastically coupling the third case section to the fourth case section can be accomplished using the fourth section coupler. In some examples, a first side of the fourth section coupler can be mechanically or otherwise coupled to the third case section, and a second side of the third section coupler can be mechanically or otherwise coupled to the fourth case section. For example, the elastic coupling of the third case section to the fourth case section using the fourth section coupler can be similar or identical to the elastic coupling of case section 228 to case section 226 using section coupler 227, as illustrated in FIG. 2.

Although the invention has been described with reference to specific embodiments, it will be understood by those skilled in the art that various changes may be made without departing from the scope of the invention. For example, mobile digital media device case 110 in FIG. 1 and mobile digital media device case 210 in FIG. 2 can be manipulated to be configured as shown in FIGS. 3-10. As another example, the case section couplers described herein can be rigid hinges, flexible bands, etc. If the case section couplers are rigid hinges, the case sections can be flexible or stretchable to provide the functionality described herein. If the case section hinges are flexible bands, the case sections can be rigid to provide the functionality described herein. Additional examples of such changes have been given in the foregoing description. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the subject matter described herein and claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefit, advantage, solution, or element is expressly stated in such claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A mobile media device case, comprising:
a first portion, the first portion of the mobile media device case having a first interior side and a first exterior side, the first portion has a rectangular configuration, the first portion comprising a first top edge, a first right edge, a first left edge and a first bottom edge, the first interior side having a first interior plane portion and a first interior remainder portion, the first interior plane portion of the first interior side of the first portion is configured to form a first plane defined by the first right edge and the first bottom edge and further configured to receive a first portion of a back of a mobile media device, the first interior remainder portion of the first interior side of the first portion configured to rise away from the first interior plane portion of the first interior side of the first portion and defined by the first top edge and the first left edge, the first top edge configured to receive a first section of a top side of the mobile media device and the first left edge configured to receive a first section of a left side of the mobile media device;

a second portion, the second portion of the mobile media device case having a second interior side and a second exterior side, the second portion has a rectangular configuration, the second portion including a second top edge, a second right edge, a second left edge and a second bottom edge, the second interior side having a second interior plane portion and a second interior remainder portion, the second interior plane portion of the second interior side of the second portion configured to form a second plane defined by the second left edge and the second bottom edge and further configured to receive a second portion of the back of the mobile media device, the second interior remainder portion of the second interior side of the second portion configured to rise away from the second interior plane portion of the second interior side of the second portion and defined by the second top edge and the second right edge, the second top edge configured to receive a second section of the top side of the mobile media device and the second right edge configured to receive a second section of a right side of the mobile media device;

a third portion, the third portion of the mobile media device case having a third interior side and a third exterior side, the third portion has a rectangular configuration, the third portion including a third top edge, a third right edge, a third left edge and a third bottom edge, the third interior side having a third interior plane portion and a third interior remainder portion, the third interior plane portion of the third interior side of the third portion configured to form a third plane defined by the third right edge and the third top edge and further configured to receive a third portion of the back of the mobile media device, the third interior remainder portion of the third interior side of the third portion configured to rise away from the third interior plane portion of the third interior side of the third portion and defined by the third bottom edge and the third left edge, the third bottom edge configured to receive a third section of a bottom side of the mobile media device and the third left edge configured to receive a third section of the left side of the mobile media device; and a fourth portion, the fourth portion of the mobile media device case having a fourth interior side and a fourth exterior side, the fourth portion has a rectangular configuration, the fourth portion including a fourth top edge, a fourth right edge, a fourth left edge and a fourth bottom edge, the fourth interior side having a fourth interior plane portion and a fourth interior remainder portion, the fourth interior plane portion of the fourth interior side of the fourth portion configured to form a plane defined by the fourth left edge and the fourth top edge and further configured to receive a portion of the back of the mobile media device, the fourth interior remainder portion of the fourth interior side of the fourth portion configured to rise away from the fourth interior plane portion of the fourth interior side of the fourth portion and defined by the fourth bottom edge and the fourth right edge, the fourth bottom edge configured to receive a fourth section of the bottom side of the mobile media device and the fourth right edge configured to receive a fourth section of the right side of the mobile media device, wherein:
the first right edge of the first portion of the mobile media device case is elastically coupled to the second left edge of the second portion of the mobile media device case, the first bottom edge of the first portion of the mobile media device case is elastically coupled to the third top edge of the third portion of the mobile media device case, the second bottom edge of the second portion of the mobile media device case is elastically coupled to the fourth top edge of the fourth portion of the mobile media device case, and the third right edge of the third portion of the mobile media device case is elastically coupled to the fourth left edge of the fourth portion of the mobile media device case.

2. The mobile media device case of claim 1, wherein:
the first interior remainder portion is curvilinearly configured to rise away from the first interior plane portion;
the second interior remainder portion is curvilinearly configured to rise away from the second interior plane portion;
the third interior remainder portion is curvilinearly configured to rise away from the third interior plane portion; and
the fourth interior remainder portion is curvilinearly configured to rise away from the fourth interior plane portion.

3. The mobile media device case of claim 1, wherein the first top edge, the second top edge, the second right edge, the fourth right edge, the fourth bottom edge, the third bottom edge, the third left edge, and the first left edge are each configured to receive a portion of a front portion of the mobile media device.

4. The mobile media device case of claim 3, wherein:
the first top edge comprises a first top case section molding configured to secure a first region of the front portion of the mobile media device;
the second top edge comprises a second top case section molding configured to secure a second region of the front portion of the mobile media device;
the second right edge comprises a second right case section molding configured to secure a third region of the front portion of the mobile media device;
the fourth right edge comprises a fourth right case section molding configured to secure a fourth region of the front portion of the mobile media device;
the fourth bottom edge comprises a fourth bottom case section molding configured to secure a fifth region of the front portion of the mobile media device;
the third bottom edge comprises a third bottom case section molding configured to secure a sixth region of the front portion of the mobile media device;
the third left edge comprises a third left case section molding configured to secure a seventh region of the front portion of the mobile media device; and
the first left edge comprises a first left case section molding configured to secure an eighth region of the front portion of the mobile media device.

5. The mobile media device case of claim 1, wherein:
a first section coupler elastically couples the first right edge of the first portion of the mobile media device case to the second left edge of the second portion of the mobile media device case;
a second section coupler elastically couples the first bottom edge of the first portion of the mobile media device case to the third top edge of the third portion of the mobile media device case;
a second section coupler elastically couples the second bottom edge of the second portion of the mobile media device case to the fourth top edge of the fourth portion of the mobile media device case; and
a fourth section coupler elastically couples the third right edge of the third portion of the mobile media device case to the fourth left edge of the fourth portion of the case.

6. The mobile media device case of claim 5, wherein the first section, the second section, the third section, and the fourth section comprises at least one of: elastic fabric, elastic webbing, or silicone.

7. The mobile media device case of claim 1, wherein the first portion, the second portion, the third portion, and the fourth portion comprises at least one of: polycarbonate, thermoplastic polyurethane, thermoplastic elastomer, thermoplastic elastomer, or leather.

8. The mobile media device case of claim 1, wherein one of the first portion, the second portion, the third portion, or the fourth portion includes a camera well.

9. A mobile media device enclosure, comprising
an enclosure having an interior, an exterior, a top side, a bottom side, a right side, and a left side, the interior configured to form a cavity, the cavity is sized to retain a mobile media device therein;
a vertical boundary, the vertical boundary having a substantially vertical orientation and configured to substantially bisect the mobile media device enclosure from the top side to the bottom side; and
a horizontal boundary, the horizontal boundary having a substantially horizontal orientation and configured to substantially bisect the mobile media device enclosure from the left side to the right side, wherein:
the vertical boundary and the horizontal boundary are further configured to substantially divide the mobile media device enclosure into four sections; and
each of the four sections is elastically coupled to two other sections of the four sections.

10. The mobile media device enclosure of claim 9, wherein the four sections are configured to substantially divide the mobile media device enclosure into four substantially rectangular sections.

11. The mobile media device enclosure of claim 9, wherein the four sections are arranged in a grid configuration.

12. The mobile media device enclosure of claim 11, wherein the four sections are arranged as a top left section, a top right section, a bottom left section, and a bottom right section.

13. The mobile media device enclosure of claim 12, wherein at least one of the four sections has a camera well.

14. The mobile media device enclosure of claim 12, wherein:
a first portion of the top left section of the mobile media device enclosure is elastically coupled to a second portion of the bottom left section of the mobile media enclosure;
a third portion of the top left section of the mobile media device enclosure is elastically coupled to a fourth portion of the top right section of the mobile media device enclosure;
a fifth portion of the bottom right section of the mobile media device enclosure is elastically coupled to a sixth portion of the top right section of the mobile media device enclosure; and
a seventh portion of the bottom right section of the mobile media device enclosure is elastically coupled to an eighth portion of the bottom left section of the mobile media device enclosure.

15. The mobile media device enclosure of claim 14:
a first portion of the top left section of the mobile media device enclosure is elastically coupled to a second portion of the bottom left section of the mobile media device enclosure using a first section coupler;
a third portion of the top left section of the mobile media device enclosure is elastically coupled to a fourth portion of the top right section of the mobile media device enclosure using a second section coupler;
a fifth portion of the bottom right section of the mobile media device enclosure is elastically coupled to a sixth portion of the top right section of the mobile media device enclosure using a third section coupler; and
a seventh portion of the bottom right section of the mobile media device enclosure is elastically coupled to an eighth portion of the bottom left section of the mobile media device enclosure using a fourth section coupler.

16. The mobile media device enclosure of claim 15, wherein each section of the first, second, third, and fourth section couplers is comprises at least one of: elastic fabric, elastic webbing, or silicone.

17. The mobile media device enclosure of claim 9, wherein each of the four sections include an exterior edge, each exterior edge of each of the four sections is configured to enclose a portion of a side of the mobile media device.

18. The mobile media device enclosure of claim 17, wherein each exterior edge of each the four sections further comprises an associated case section molding, the case section molding is configured to secure a portion of a front portion of the mobile media device.

19. The mobile media device enclosure of claim 9, wherein one or more of the four sections comprise at least one of: polycarbonate, thermoplastic polyurethane (TPU), thermoplastic elastomer (TPE), thermoplastic elastomer (TPR), or leather.

20. A method of using a mobile media device enclosure with a mobile media device, the method comprising:
providing the mobile media device enclosure to comprise:
a first case section;
a second case section moveably coupled to the first case section;
a third case section moveably coupled to the first case section; and
a fourth case section moveably coupled to the second case section and the third case section;
coupling the mobile media device to the mobile media device enclosure;
uncoupling the second case section and the fourth case section from the mobile media device; and
placing the second case section, the fourth case section, and a first side of the mobile media device on a surface such that the mobile media device is in a first landscape viewing mode.

21. The method of claim 20, further comprising:
re-coupling the second case section and the fourth case section to the mobile media device.

22. The method of claim 20, further comprising:
uncoupling the first case section and the second case section from the mobile media device; and
placing the first case section, the second case section, and a second side of the mobile media device on the surface such that the mobile media device is in a first portrait viewing mode.

23. The method of claim 22, further comprising:
re-coupling the first case section and the second case section to the mobile media device.

24. The method of claim 20, further comprising:
uncoupling the first case section and the third case section from the mobile media device; and
placing the first case section, the third case section, and a third side of the mobile media device on the surface such that the mobile media device is in a second landscape viewing mode.

25. The method of claim 22, further comprising:
re-coupling the first case section and the third case section to the mobile media device.

26. The method of claim 20, further comprising:
uncoupling the third case section and the fourth case section from the mobile media device; and
placing the third case section, the fourth case section, and a third side of the mobile media device on the surface such that the mobile media device is in a second portrait viewing mode.

27. The method of claim 26, further comprising:
re-coupling the third case section and the fourth case section to the mobile media device.

28. A method of providing a mobile media device enclosure configured to hold a mobile media device, the method comprising:
providing four or more case sections;
elastically coupling a first case section of the four or more case sections to a second case section of the four or more case sections;
elastically coupling the first case section of the four or more case sections to a third case section of the four or more case sections;

elastically coupling the second case section of the four or more case sections to a fourth case section of the four or more case sections; and elastically coupling the third case section of the four or more case sections to the fourth case section of the four or more case sections, wherein:

the four or more case sections are configured such that a first two of the four or more case section can be moved relative a second two of the four or more case sections to form a stand for the mobile media device.

29. The method of claim 28, wherein:

elastically coupling the first case section of the four or more case sections to the second case section of the four or more case sections comprises:

elastically coupling the first case section of the four or more case sections to the second case section of the four or more case sections to form a first side of the mobile media device enclosure;

elastically coupling the first case section of the four or more case sections to the third case section of the four or more case sections comprises:

elastically coupling the first case section of the four or more case sections to the third case section of the four or more case sections to form a second side of the mobile media device enclosure;

elastically coupling the second case section of the four or more case sections to the fourth case section of the four or more case sections comprises:

elastically coupling the second case section of the four or more case sections to the fourth case section of the four or more case sections to form a third side of the mobile media device enclosure; and elastically coupling the third case section of the four or more case sections to the fourth case section of the four or more case sections comprises:

elastically coupling the third case section of the four or more case sections to the fourth case section of the four or more case sections to form a fourth side of the mobile media device enclosure.

30. The method of claim 28, further comprising:

providing four or more section couplers, wherein:

elastically coupling the first case section of the four or more case sections to the second case section of the four or more case sections comprises:

elastically coupling the first case section of the four or more case sections to the second case section of the four or more case sections using a first section coupler of the four or more section couplers;

elastically coupling the first case section of the four or more case sections to the third case section of the four or more case sections comprises:

elastically coupling the first case section of the four or more case sections to the third case section of the four or more case sections using a second section coupler of the four or more section couplers;

elastically coupling the second case section of the four or more case sections to the fourth case section of the four or more case sections comprises:

elastically coupling the second case section of the four or more case sections to the fourth case section of the four or more case sections using a third section coupler of the four or more section couplers; and elastically coupling the third case section of the four or more case sections to the fourth case section of the four or more case sections comprises:

elastically coupling the third case section of the four or more case sections to the fourth case section of the four or more case sections using a fourth section coupler of the four or more section couplers.

31. The method of claim 28, wherein:

providing the four or more case sections comprises:

providing one of the four or more case sections with a camera lens well.

\* \* \* \* \*